United States Patent [19]

Ihara

[11] Patent Number: 4,564,608

[45] Date of Patent: Jan. 14, 1986

[54] METHOD OF PRODUCING MONOLITH CATALYSTS

[75] Inventor: Kazunori Ihara, Iwakuni, Japan

[73] Assignee: Toyo Kogyo Co., Ltd., Hiroshima, Japan

[21] Appl. No.: 554,449

[22] Filed: Nov. 22, 1983

[30] Foreign Application Priority Data

Nov. 29, 1982 [JP] Japan ............................. 57-210382

[51] Int. Cl.$^4$ ............................................. B01J 21/04
[52] U.S. Cl. .................................... 502/355; 502/439
[58] Field of Search ................... 502/355, 527, 439; 423/213.2

[56] References Cited

U.S. PATENT DOCUMENTS

| | | | |
|---|---|---|---|
| 3,264,228 | 8/1966 | Burbidge | 502/355 |
| 3,437,605 | 4/1969 | Keith | 502/439 |
| 3,893,950 | 7/1975 | Mai et al. | 502/332 |
| 3,928,239 | 12/1975 | Yonehara et al. | 502/333 |
| 4,042,738 | 8/1977 | Gulati | 502/527 |
| 4,116,883 | 9/1978 | Rhodes | 502/355 |
| 4,127,691 | 11/1978 | Frost | 502/527 |
| 4,200,552 | 4/1980 | Noguchi et al. | 502/333 |
| 4,231,900 | 11/1980 | Kato et al. | 502/355 |
| 4,274,981 | 6/1981 | Suzuki et al. | 502/304 |
| 4,371,513 | 2/1983 | Sanchez et al. | 502/355 |
| 4,404,007 | 8/1983 | Tukao et al. | 210/510.1 |
| 4,438,219 | 3/1984 | Brandenburg et al. | 502/355 |
| 4,442,024 | 4/1984 | Crone, Jr. | 502/355 |
| 4,483,940 | 11/1984 | Ono et al. | 502/523 |

*Primary Examiner*—D. E. Gantz
*Assistant Examiner*—Anthony McFarlane
*Attorney, Agent, or Firm*—Burns, Doane, Swecker & Mathis

[57] ABSTRACT

A method of producing monolith catalysts for catalysts to be used in a measure to purify the exhaust gases of a vehicle, in which, in a process of producing alumina slurry liquid, the dispersibility of the alumina particles in the slurry liquid is improved by the use of water, aluminium-nitrate powder instead of acid, alkali to allow the slurry liquid to be uniformly adhered on the surface of the dipped carrier, thereby to prevent the alumina coat layer from coming off in the high temperature.

1 Claim, 2 Drawing Figures

METHOD OF PRODUCING MONOLITH CATALYSTS

BACKGROUND OF THE INVENTION

1. Field of the Invention

The present invention relates to a method of producing monolith catalysts for constituting catalysts to be used in a measure to purify the exhaust gases of vehicles.

2. Description of the Prior Art

Generally, in known catalysts of this kind, cordierite (i.e., a compound of $Al_2O_3$, $MgO$, $SiO_2$) is used as monolith catalyst carrier. However, it is small in surface area as the catalyst carrier and is short in gas contact so that sufficient activity is not obtained by itself. To provide the sufficient activity, alumina having the properties of high surface area is coated on the surface of the cordierite carrier, and the coated alumina layer is impregnated with noble metal such as platinum, palladium or the like to provide higher activity.

As a method of producing the alumina coat layer on the carrier surface, there was known a method of dipping the carrier in alumina slurry liquid provided through the blending, kneading of hydroalumina (to be added with the active alumina as occasional demands) in aqueous solution hydrochloride, and thereafter drying, burning it, for instance, as disclosed within Japanese Patent Publication No. 31,939/1982. A process of producing liquid composition for use in alumina coating was disclosed in this publication, comprising the steps of slowly adding 5 to 30 parts by weight of bochmite impalpable powder of 325 meshes or less, while 95 to 70 parts by weight of 2.5 to 0.1 normal inorganic-acid aqueous solution or 4.5 to 0.1 normal organic-acid aqueous solution was being violently agitated, thereafter further agitating them for 20 to 30 minutes, curing the bochmite grains at cold temperatures, under no-pressure so that the bochmite grains could not be visually recognized and might become 20 to 200 centi-poise (hereinafter referred to as cp) in viscosity. The alumina coat layer provided in this manner is comparatively good in adherence property with respect to the cordierite carrier in the normal endurance temperature region (for example, 850° C. or less) so that the alumina coat layer can be sufficiently used. However, the alumina coat layer comes off in the temperature zone higher than 850° C. by all means. Accordingly, in the use as the catalyst, the noble metal broke off and reduced due to the coming off of such alumina coat layer, thus resulting in reduced catalytic activity.

It seems that the coming-off phenomenon of the alumina coat layer is caused due to the use of the aqueous solution hydrochloride for the blending, kneading operation of the hydroalumina, to the uniform adhesion of the slurry liquid on the surface of the carrier caused due to the relatively inferior dispersibility of the alumina particles, to the unstable crystal structure of the alumina during the burning operation.

SUMMARY OF THE INVENTION

An object of the present invention is to provide a method of producing monolith catalysts for constituting catalysts to be used in vehicles which can eliminate the disadvantages inherent to the conventional method as mentioned above.

Another object of the present invention is to provide a method of producing monolith catalysts to improve, in a process of producing alumina slurry liquid, the dispersibility of the alumina particles in the slurry liquid by the use of water and aluminum-nitrate powder instead of acid, alkali to allow the slurry liquid to be uniformly adhered on the surface of the dipped carrier thereby to prevent the alumina coat layer from coming off in the high temperature region (i.e., 850° C. or higher).

According to the present invention, there is provided a method of producing monolith catalysts, comprising the steps of adding 60 through 120 parts by weight of water with respect to 100 parts of blended dust, which is provided through the blending operation of hydroalumina powder, 85 to 95% by weight, and aluminium-nitrate powder, 5 to 15% by weight, blending and kneading it, thereafter adding, blending kneading activated alumina powder, 30 to 70 parts with respect to 100 parts of blended dust, to produce alumina slurry liquid, dipping catalytic carrier in said alumina slurry liquid to cause the alumina slurry liquid on the surfaces of said catalytic carrier, thereafter taking it out to dry it at 100° to 200° C. for one to three hours, furthermore burning it at 600° to 800° C. for two through five hours.

These and other objects, features, aspects and advantages of the present invention will become more apparent from the following detailed description of the present invention when taken in conjunction with the accompanying drawings.

DESCRIPTION OF THE PREFERRED EMBODIMENTS

First of all, it is to be noted that the manufacturing method of the present invention is characterized by the sequential performance of a blending, kneading process of adding aluminum-nitrate powder to hydroalumina (for example, bochmite or the like) powder for the blending operation of them, thereafter adding water and activated alumina powder for the blending, and kneading operation of them to produce alumina slurry liquid, a dipping process of dipping the catalytic carrier in the alumina slurry liquid to adhere the slurry liquid on the carrier surface, a drying process of taking it out to dry it, and a burning process of burning it thereafter.

Figure 1:
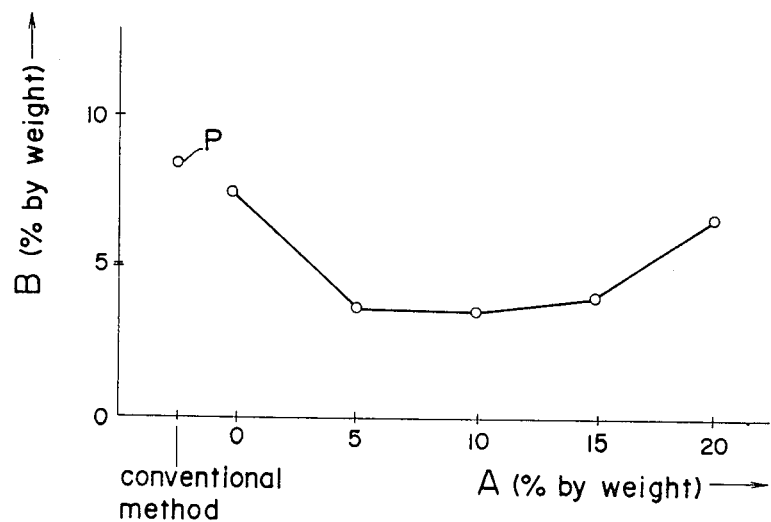
FIG. 1 is a graph showing variation in the comeoff amount B (% by weight) of the alumina coat layer after the thermal shock test with the addition amount A (% by weight) of the aluminum-nitrate to the hyroalumina.

According to the present invention, in the blending, kneading process, the aluminum-nitrate, instead of the conventional acid, alkali, is used, because the dispersibility of the alumina particles in the slurry liquid is improved to impregnate the carrier so far as the interiors of the orifices of the carrier with alumina during the carrier dipping, and to make the alumina crystal condition better after the burning process. The aluminum-nitrate amount with respect to the hydroalumina is desired to be selected within the range of 5 to 15% by weight, since the dispersibility of the alumina particles in the slurry liquid is deteriorated at 5% by weight or less or the alumina crystal condition during the burning operation is deteriorated at 15% by weight or more. FIG. 1 shows a graph showing the variation in the come-off amount B (% by weight) of the alumina coat layer after the thermal shock test with respect to the variation in the aluminum-nitrate amount A (% by weight) with respect to the hydroalumina. According to FIG. 1, it is found out that the aluminum-nitrate amount with respect to the hydroalumina is desired to be within the above-mentioned range. It is to be noted that the come-off amount shown at a point P showns that in the conventional method. Also, the water addition is necessary to give the optimum viscosity characteristics to the slurry liquid. The addition amount is desired to be selected within the range of 60 to 120 parts by weight (hereinafter referred to as parts) of water with respect to 100 parts of the blended dust, which is provided through the blending operation of hydroalumina powder and aluminum-nitrate powder. The viscosity increases and the slurry liquid does not penetrate into the parts of the dipped carrier in the water addition amount of 60 parts or less, while the sufficient viscosity is not provided in the water addition amount of 120 parts or higher, thus causing a drooping phenomenon on the surface of the carrier to make the adhesion thereof on the alumina layer difficult to be made. In addition, the active alumina is added to improve the catalyst activity at the amount which is desirable to be selected within the range of 30 to 70 parts of the activated alumina with respect to 100 parts of the blended dust. The sufficient activity improvement is not provided in the addition amount of 30 parts or less, while the viscosity increases in the addition amount of 70 parts or higher so that optimum viscosity characteristics are not provided.

In the dipping process, the surface condition of the alumina particles under the colloidal condition in the slurry liquid is changed so that it may become more advantageous, as compared with the conventional example, with respect to the dispersibility in terms of ion adsorption amount or hydration amount, thus resulting in superior dispersibility of the alumina particles. The alumina particles penetrate into not only the surfaces of the carrier, but also so far as the interiors of the orifices of the carrier. As a result, the carrier firmly combines with the alumina layer, thus improving the adhesion property.

The drying process is provided to remove the moisture prior to the burning operation. It is performed for three hours at 100° C. to 200° C. The moisture cannot be removed sufficiently at 100° C. or less, and defects may be caused, due to heat, within the carrier at 200° C. or higher. Also, the moisture cannot be removed sufficiently in one hour or less in drying time, and the effect is saturated in three hours or more, thus being meaningless.

In the burning process, the hydroalumina (for instance, bochmite or the like) adhered on the surfaces of the carrier is turned into the crystals of γ-alumina to activate it. The process is performed for two to five hours at 600° C. to 800° C. At 600° C. or lower, the crystals of the γ-alumina are not provided at 600° C. or lower. Thermal shocks are provided due to the influences of the thermal stress at 800° C. or higher. Also, the sufficient effect is not provided in two hours or less in burning time. The effect is saturated in five hours or more, thus being meaningless.

In the monolith catalyst provided by the method of the present invention, an alumina coat layer is formed, which is uniform in quality, superior in adherence property, stable in crystal construction. The come-off phenomenon is not caused any more even in not only the normal durability temperature region (such as 850° C. or lower), but also the temperature region (such as 850° C. or higher) higher than it. Thus, according to the method of the present invention, the monolith catalytic carrier is provided, which is extremely superior in the come-off resisting property.

EMBODIMENT 1

Water of 880 g is added to the blended powder, the mixture of bochmite powder 1.0 kg and aluminum-nitrate powder 100 g provided with the use of a ball mill. They are blended, kneaded. Thereafter γ-alumina powder 1.0 kg is added thereto, and blended, kneaded to produce alumina slurry liquid. The carrier is dipped, during the agitating operation, into the slurry liquid to cause the slurry liquid to adhere on the surfaces of the carrier. Thereafter, it is taken out and is dried at 150° C. for three hours. Furthermore, it is burned at 700° C. for three hours with the result that monolith catalyst of 20% by weight in aluminacoat adhesion amount, is produced.

Figure 2:
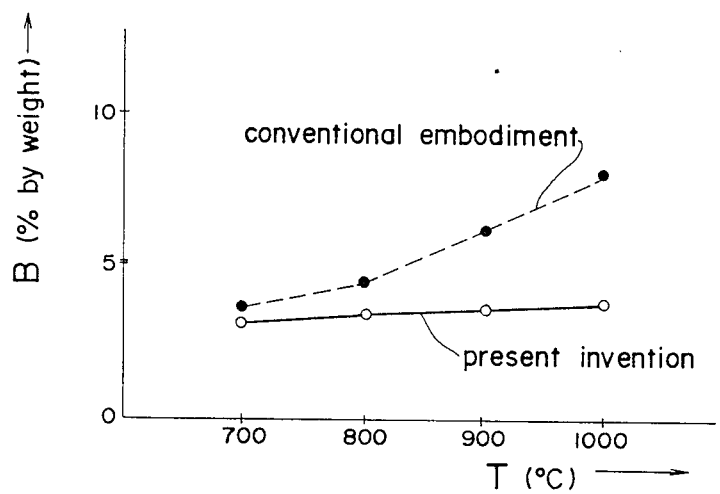
FIG. 2 is a graph showing, in the comparison between the embodiment of the present invention (shown in solid line) and the conventional embodiment (shown in dotted line), the variation in the come-off amount B (% by weight) of the alumina coat layer after the thermal shock test with respect to the set temperature T (° C.) of the thermal shock test.

Results of the thermal shock test conducted upon the monolith catalyst provided by the present embodiment are shown in FIG. 2. In the thermal shock test, the cycle of heating the catalyst at 700° through 1,000° C. for twenty seconds, and thereafter cooling it at 200° C. for twenty seconds is repeated twenty times. Referring to FIG. 2, reference character T of the quadrature-axis shows a set temperature of the thermal shock test, while reference character B of the vertical-axis shows alumina coat come-off amount B (% by weight) caused after the thermal shock test. One embodiment of the present invention is shown in a solid line, while the other conventional embodiment is shown in a dotted line. In the conventional embodiment, water of 2.8 kg is added to and mixed with the bochmite powder of 1 kg, and also, dense hydrochloric acid of 47 ml is added thereinto. Furthermore, γ-alumina powder of 1 kg is added thereto, and blended, kneaded therewith to produce alumina slurry liquid. Carrier is dipped thereinto to cause the slurry liquid to adhere on the surfaces of the carrier. Thereafter, it is dried at 150° C. for three hours and is burned at 700° C. for three hours. The monolith catalyst thus produced is used for catalysts in vehicles. According to the above description, it is apparent that the monolith catalyst is extremely superior in the come-off resistance property.

Although the present invention has fully been described in connection with the preferred embodiment thereof with reference to the accompanying drawings, it is to be noted that various changes and modifications are apparent to those skilled in the art. Such changes and modifications are to be understood as included within the scope of this invention unless they depart therefrom.

What is claimed is:

1. A method of producing a monolith catalyst for use in an automobile exhaust system wherein the catalyst has an alumina coat layer capable of withstanding temperatures of about 850° C. or higher without becoming separated, comprising the steps of (i) adding from about 60 to 120 parts by weight of water with respect to 100 parts by weight of blended dust, which blended dust is provided through the blending of from about 85 to 95% by weight of hydroalumina powder and from about 5 to 15% by weight of aluminum nitrate powder;

(ii) blending and kneading the mixture of water and blended dust;

(iii) adding from about 30 to 70 parts by weight of activated alumina powder with respect to 100 parts by weight of blended dust to the mixture of water and blended dust, and then blending to produce an alumina slurry;

(iv) coating the surface of a cordierite catalyst carrier with the alumina slurry by dipping the cordierite catalyst into the alumina slurry;

(v) drying the cordierite carrier at about 100° to 200° C. for from about 1 to 3 hours; and then (vi) burning the carrier at a temperature of from about 600° to 800° C. for from about 2 to 5 hours.

* * * * *